(12) United States Patent
Katou et al.

(10) Patent No.: US 10,173,402 B2
(45) Date of Patent: Jan. 8, 2019

(54) DECORATIVE RESIN COMPOSITION AND MULTILAYERED DIRECTLY BLOW-FORMED BOTTLE HAVING A METALLIC LAYER FORMED BY USING THE SAME COMPOSITION

(71) Applicants: Toyo Seikan Co., Ltd., Tokyo (JP); TOYO ALUMINIUM KABUSHIKI KAISHA, Osaka-shi, Osaka (JP)

(72) Inventors: Yuuichirou Katou, Yokohama (JP); Satomi Ozawa, Tokyo (JP); Yusuke Anzai, Yokohama (JP); Tetsuya Fudaba, Osaka (JP); Akihiko Ikeya, Osaka (JP)

(73) Assignees: TOYO SEIKAN CO., LTD., Tokyo (JP); TOYO ALUMINIUM KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/749,687

(22) PCT Filed: Aug. 25, 2016

(86) PCT No.: PCT/JP2016/074817
§ 371 (c)(1),
(2) Date: Feb. 1, 2018

(87) PCT Pub. No.: WO2017/038623
PCT Pub. Date: Mar. 9, 2017

(65) Prior Publication Data
US 2018/0229481 A1 Aug. 16, 2018

(30) Foreign Application Priority Data

Aug. 31, 2015 (JP) ................. 2015-170255

(51) Int. Cl.
*B32B 27/20* (2006.01)
*B32B 27/00* (2006.01)
(Continued)

(52) U.S. Cl.
CPC .............. *B32B 27/20* (2013.01); *B32B 27/00* (2013.01); *B32B 27/32* (2013.01); *B65D 1/00* (2013.01);
(Continued)

(58) Field of Classification Search
CPC ......... B32B 27/20; B32B 27/00; B32B 27/32; B65D 1/00; C08K 3/08; C08K 3/013;
(Continued)

(56) References Cited

U.S. PATENT DOCUMENTS

| 8,513,344 B2 | 8/2013 | Asano et al. |
| 2003/0019400 A1 | 1/2003 | Deckers et al. |
| 2017/0217141 A1 | 8/2017 | Katou et al. |

FOREIGN PATENT DOCUMENTS

| EP | 0 292 007 A2 | 11/1988 |
| JP | 63-289548 A | 11/1988 |

(Continued)

OTHER PUBLICATIONS

International Search Report for PCT/JP2016/074817, dated Nov. 22, 2016.

*Primary Examiner* — Michael C Miggins
(74) *Attorney, Agent, or Firm* — Sughrue Mion, PLLC

(57) ABSTRACT

A decorative resin composition containing a metal pigment having an average thickness of not more than 600 nm dispersed in a blend of a low-density polyethylene (LDPE) having a density of not less than 0.910 g/cm³ but less than 0.930 g/cm³ and a linear low-density polyethylene (LLDPE) having a density of 0.910 to 0.925 g/cm³.

10 Claims, 2 Drawing Sheets

(51) Int. Cl.
   *B32B 27/32*   (2006.01)
   *B65D 1/00*   (2006.01)
   *C08K 3/08*   (2006.01)
   *C08L 23/06*   (2006.01)
   *C08L 23/08*   (2006.01)
   *C08K 3/013*   (2018.01)
   *C08F 10/02*   (2006.01)

(52) U.S. Cl.
   CPC .............. *C08F 10/02* (2013.01); *C08K 3/013* (2018.01); *C08K 3/08* (2013.01); *C08L 23/06* (2013.01); *C08L 23/08* (2013.01); *C08L 23/0815* (2013.01); *C08F 2500/17* (2013.01); *C08K 2003/085* (2013.01); *C08K 2003/0812* (2013.01); *C08L 2203/10* (2013.01); *C08L 2207/066* (2013.01)

(58) Field of Classification Search
   CPC ...... C08K 2003/0812; C08K 2003/085; C08L 23/06; C08L 23/08; C08L 23/0815; C08L 2203/10; C08L 2207/066; C08F 10/02; C08F 2500/17
   See application file for complete search history.

(56) References Cited

FOREIGN PATENT DOCUMENTS

| | | |
|---|---|---|
| JP | 2003-517081 A | 5/2003 |
| JP | 2003-335315 A | 11/2003 |
| JP | 2008-011773 A | 1/2008 |
| JP | 2010-121092 A | 6/2010 |
| JP | 2011-229407 A | 11/2011 |
| JP | 2013-154585 A | 8/2013 |
| WO | 2016/031846 A1 | 3/2016 |

DECORATIVE RESIN COMPOSITION AND MULTILAYERED DIRECTLY BLOW-FORMED BOTTLE HAVING A METALLIC LAYER FORMED BY USING THE SAME COMPOSITION

CROSS REFERENCE TO RELATED APPLICATIONS

This application is a National Stage of International Application No. PCT/JP2016/074817 filed Aug. 25, 2016, claiming priority based on Japanese Patent Application No. 2015-170255, filed Aug. 31, 2015, the contents of all of which are incorporated herein by reference in their entirety.

TECHNICAL FIELD

This invention relates to a decorative resin composition containing a metal pigment. More specifically, the invention relates to a multilayered directly blow-formed bottle having a metallic layer formed by using the same resin composition.

BACKGROUND ART

Directly blow-formed bottles, in general, have body walls that are rich in flexibility and enable the contents to be easily discharged upon being squeezed. Therefore, they have been widely used as plastic containers for containing a variety of kinds of contents such as foods through up to cosmetics, hair-care products (shampoo, rinse, etc.) and the like products.

Here, to enhance commercial values of the plastic containers, means has been employed to impart an appearance of a metallic tone to them. However, imparting the metallic tone is limited to such expensive products as containers for cosmetics and the like.

That is, the appearance of metallic tone can be imparted to the plastic containers by such a method as spraying a metal pigment to form a coating of the metal pigment on the outer surfaces of the containers or a method of forming a shrink film by gravure printing a metal pigment, and covering the outer surfaces of the containers with the shrink film. According to the above methods, however, the coating must be applied for each container or the shrink film must be applied for each container greatly increasing the cost. Therefore, the above methods could not be practically applied to inexpensive containers for containing, for example, hair-care products.

In order to inexpensively impart metallic appearance, for example, a patent document 1 is proposing a master batch system in which a master batch is formed by kneading a flaky metal pigment into, for example, a resin, and directly blow-forming the resin blended with the master batch into a bottle so as to be provided with a layer that is decorated with the metal pigment. The master batch system is capable of imparting metallic appearance more inexpensively than the above-mentioned spray-coating method or the shrink film method. In this case, however, the metallic appearance is not sufficient, and it has been desired to further improve the metallic appearance.

Besides, with the above shrink film system, the containers are limited to those having straight body walls or to those of the shapes close thereto.

Further, the present applicant has previously proposed a multilayered directly blow-formed bottle having a metallic layer of a resin in which a metal pigment of an average thickness of not more than 1 μm is dispersed, the metallic layer being formed at a position where it can be seen from the outer surface side (Japanese Patent Application No. 2014-172762). For the multilayered directly blow-formed bottle, a metal pigment having an average thickness of as very small as not more than 1 μm is used to impart the metallic appearance. Though this expresses a high degree of metallic appearance, it has been demanded to realize a more increased degree of metallic appearance.

PRIOR ART DOCUMENT

Patent Document

Patent document 1: JP-A-2010-121092

Outline of the Invention

Problems that the Invention is to Solve

It is, therefore, an object of the present invention to provide a decorative resin composition that is decorated in a metallic tone by a very inexpensive means and that is capable of imparting very excellent metallic appearance.

Another object of the present invention is to provide a multilayered directly blow-formed bottle having a metallic layer formed by using the above decorative resin composition and a method of producing the same.

Means for Solving the Problems

According to the present invention, there is provided a decorative resin composition containing a metal pigment having an average thickness of not more than 600 nm dispersed in a blend of a low-density polyethylene (LDPE) having a density of not less than 0.910 g/cm$^3$ but less than 0.930 g/cm$^3$ and a linear low-density polyethylene (LLDPE) having a density of 0.910 to 0.925 g/cm$^3$.

In the decorative resin composition of the present invention, it is desired that:
(1) The low-density polyethylene (LDPE) and the linear low-density polyethylene (LLDPE) are blended together at a mass ratio of LDPE:LLDPE=1:9 to 9:1;
(2) Both the low-density polyethylene (LDPE) and the linear low-density polyethylene (LLDPE) have melt flow rate (190° C.) of not more than 1.0 g/10 min.;
(3) The metal pigment is dispersed in an amount of 0.1 to 30.0 parts by mass per a total amount of 100 parts by mass of the low-density polyethylene (LDPE) and the linear low-density polyethylene (LLDPE); and
(4) The metal pigment is an aluminum pigment.

In the invention, further, there is provided a multilayered directly blow-formed bottle in which a metallic layer formed by using the decorative resin composition is located at a position where it can be seen from the outer surface side.

Here, it is desired that:
(5) When light is incident on the outer surface of a bottle wall at an angle of 45 degrees by using a multi-angle colorimeter, a lightness $L^*_{15}$ ($L^*a^*b^*$ color system) due to light reflected in a direction of 15 degrees relative to regularly reflected light is not less than 150; and
(6) The multilayered directly blow-formed bottle, usually, has such a structure that the metallic layer is formed on a lower side of an outer surface layer or an outer surface transparent resin layer.

It is, further desired that:
(7) When the shear viscosities (Pa·s) of a resin that is forming a layer neighboring the metallic layer on an inner side thereof are denoted by $V_6$ and $V_{30}$, the shear viscosities (Pa·s) being the values at shear rate $6 \text{ s}^{-1}$ and $30 \text{ s}^{-1}$ measured at a temperature of 210° C., then the blend used for forming the metallic layer satisfies the following viscosity condition formulas (1) and (2):

$$\eta_6 \geq V_6 - 2000 \quad (1)$$

$$\eta_{30} \geq V_{30} - 2000 \quad (2)$$

wherein $\eta_6$ and $\eta_{30}$ are, respectively, shear viscosities (Pa·s) at the shear rate $6 \text{ s}^{-1}$ and $30 \text{ s}^{-1}$ measured at a temperature of 210° C.

According to the present invention, further, there is provided a method of producing the multilayered directly blow-formed bottle by preparing the decorative resin composition by a melt-mixing method in an extruder, co-extruding a resin composition prepared in the extruder into a preform of a shape of a pipe in which a layer of the composition is formed at a position where it can be seen from an outer surface side, and blowing a fluid into the preform that is closed at one end thereof so that the preform is shaped into a bottle.

Effects of the Invention

In the decorative resin composition of the present invention, a metal pigment having an average thickness of not more than 600 nm is dispersed therein. The metal pigment expresses a metallic decorative appearance. Here, a particularly important feature resides in that the metal pigment is dispersed in a blend of a low-density polyethylene (LDPE) and a linear low-density polyethylene (LLDPE).

That is, the LDPE is obtained by polymerizing ethylene in an environment of a high pressure (about 1,000 to about 4,000 atm) and a high temperature (about 100 to about 350° C.) using a radical initiator as the catalyst, and is often called high-pressure process polyethylene. The LDPE obtained by this process has an ethylene chain that contains branches of long chains. This structure brings about a decreased density and flexibility. On the other hand, the LLDPE is obtained by copolymerizing ethylene as a repeating unit with small amounts of a plurality of kinds of α-olefins (e.g., 1-butene, 1-hexene, 4-methylpentene-1, 1-octene, etc.) and has short branches introduced in a random fashion bring about a decrease in the density. As compared to the LDPE, the LLDPE has short branches and a high degree of molecular linearity.

In the present invention, the metal pigment having a small thickness is dispersed in the blend of the LDPE and LLDPE having the above-mentioned structures. When the resin composition is melt-extruded, therefore, the metal pigment is quickly oriented in a direction in which it is extruded. As a result, in the directly blow-formed container, the layer formed by extruding the resin composition is made present at a position where it can be seen from the exterior. Namely, light is very little reflected irregularly but is mostly reflected regularly accounting for the expression of excellent metallic appearance.

When, for example, the metal pigment is dispersed in the LDPE only, the metal pigment can be oriented to some extent in a direction in which it is extruded by melt extrusion. The orientation, however, is not sufficient and much metal pigment remains without being oriented. Therefore, the metallic appearance is not sufficient. This is presumably due to that the LDPE contains long branches much and, therefore, at the time of melt extrusion, stress is exerted on the metal pigment even in the directions other than the direction of extrusion. When the LDPE is blended with the LLDPE that has a high degree of linearity, on the other hand, effectively reduced stress is exerted during the melt extrusion on the metal pigment in the directions other than the direction of extrusion. As a result, it is considered that more metal pigment can be oriented in the direction of extrusion and more excellent metallic appearance is expressed.

Here, when the metal pigment is dispersed in only the LLDPE which has poor fluidity, there tend to develop shark skin or die lines due to irregular thickness thereof in the circumferential direction and, besides, the metal pigment is not oriented to a sufficient degree. This is presumably due to that the LLDPE has a high degree of molecular linearity and it is difficult to orient the metal pigment based on its fluidity.

As described above, excellent metallic appearance is exhibited by the multilayered directly blow-formed container that has a layer (metallic layer) formed by using the decorative resin composition of the invention at a position where it can be seen from the exterior. For example, as described in Examples appearing later, when the light is incident on the outer surface of the bottle wall at an angle of 45 degrees by using a multi-angle colorimeter, the lightness $L^*_{15}$ due to the light reflected in a direction of 15 degrees relative to the regularly reflected light is as very high as not less than 150. The larger the value of lightness, the larger the amount of the regularly reflected light and more excellent metallic appearance is expressed.

Here, $L^*_{15}$ is an L* value based on the L*a*b* color system (CIE 1976 color space).

Further, the multilayered directly blow-formed bottle having the above-mentioned metallic layer exhibits a highly decorative appearance (metallic appearance) due to the metallic layer. Besides, the multilayered directly blow-formed bottle expresses metallic appearance without the need of executing the after treatment such as spray coating or treatment with a shrink film and, therefore, can be obtained at a very reduced cost which is a great advantage.

Namely, the multilayered directly blow-formed bottle of the invention is not limited to the use of expensive cosmetic products but can also be effectively used for packing low-cost products, as typified by liquid detergents and hair care products such as shampoo, rinse, etc.

MODES FOR CARRYING OUT THE INVENTION

<Decorative Resin Compositions>

Figure 1A:
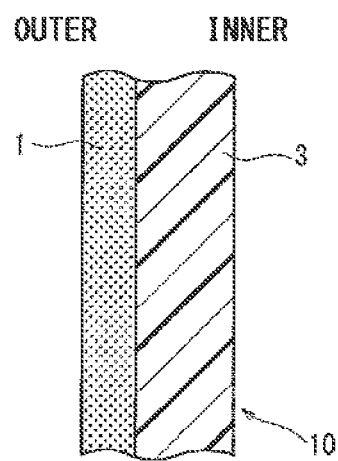
FIGS. 1A, 1B and 1C are schematic views illustrating the layer structures of multilayered directly blow-formed bottles of the present invention.

The decorative resin composition of the present invention is obtained by dispersing a metal pigment in a base resin that serves as a matrix. As the base resin, the invention uses a low-density polyethylene (LDPE) and a linear low-density polyethylene (LLDPE).

The metal pigment to be dispersed in the base resin develops metallic appearance. Examples thereof are those that expresses metallic luster, such as aluminum pigment, copper pigment, copper-zinc (brass) pigment and copper-tin (bronze) pigment as well as luster pigments obtained by coating the surfaces of mica or the like with aluminum, iron oxide or titanium oxide. From the standpoint of metallic luster, in particular, it is desired to use the aluminum pigment and the aluminum-type luster pigment.

In the present invention, among the above-mentioned metal pigments, in particular, there is used a thin metal pigment having an average thickness of not more than 600 nm and, preferably, in a range of 100 to 500 nm. That is, when the metal pigment having such a small average thickness is used, the metal pigment can be quickly oriented in the direction in which the base resin flows (direction of extrusion) at the time of melt extrusion that will be described later making it possible to reduce the irregularly reflected light and to express excellent metallic tone. For example, if there is used a metal pigment having an average thickness larger than the above range, directivity of the reflected light becomes low, irregularly reflected light increases and hence the metallic appearance becomes insufficient. Further, if the thickness of the metal pigment is too small, the strength so decreases that the metal pigment is damaged when it is melt-extruded and the metallic appearance tends to decrease to some extent.

The metal pigment should have an average particle size, usually, in a range of 1 to 50 μm and, specifically, 5 to 30 μm, and an aspect ratio (ratio of particle size and thickness: particle size (μm)/thickness (μm)) of not less than 10. The metal pigment of a flat shape having a large particle size compared to the thickness has very high directivity of the reflected light in the oriented state, and is very advantageous in imparting the metallic appearance.

Desirably, further, the metal pigment is obtained by machining a metal powder into flakes of a flat shape by using a ball mill or the like. This is because the metal pigment thus obtained, usually, has a thickness of as large as 100 nm or more and is not easily damaged during the melt extrusion.

The above metal pigment is, usually, dispersed in a dispersant and, in this state, is mixed into the base resin. As the dispersant, there is favorably used the one that helps improve the dispersion of the metal pigment in the base resin without spoiling the extrusion formability of the base resin. For example, there can be desirably used hydrocarbon type waxes such as polyethylene wax and polypropylene wax, as well as higher fatty acid wax.

The dispersant is, usually, used in an amount of about 10 to about 50 parts by mass per 100 parts by mass of the metal pigment.

In the present invention, the metal pigment is mixed into the base material that will be described later in an amount of 0.1 to 30.0 parts by mass, specifically, 0.5 to 10.0 parts by mass and, more preferably, 1.0 to 5.0 parts by mass per 100 parts by mass of the base resin from the standpoint of expressing favorable metallic appearance. If the amount of the metal pigment is too small, the metallic appearance cannot be expressed to a sufficient degree. If the metal pigment is used in an excess amount, on the other hand, the metal pigment is not sufficiently oriented and the metallic appearance becomes insufficient.

As the base resin for dispersing the metal pigment therein, there can be used a polyethylene that can be formed into the shape of a bottle through the direct blow-forming. As the base resin, specifically, there is used a blend of a low-density polyethylene (LDPE) having a density of not less than 0.910 g/cm$^3$ but less than 0.930 g/cm$^3$ and a linear low-density polyethylene (LLDPE) having a density of 0.910 g/cm$^3$ to 0.925 g/cm$^3$. By adding the metal pigment into the base resin which is a blend of the lowly linear LDPE (having large branches) and the highly linear LLDPE having short branches, it is made possible to effectively orient the metal pigment in a direction in which the base resin is extruded and, therefore, to express excellent metallic appearance.

In the invention, the LDPE and LLDPE are, usually, mixed together at a mass ratio of 1:9 to 9:1. To obtain a particularly high degree of metallic appearance, however, it is desired to use the LDPE in an amount of 50 to 85 parts by mass and, most desirably, 50 to 75 parts by mass per a total of 100 parts by mass of the LDPE and LLDPE. That is, to orient the metal pigment in the direction of extrusion, the base resin needs to contain the LDPE having long branches as a main component. To suitably suppress the orientation of the metal pigment due to the flow of the LDPE, the highly linear LLDPE is used in an amount equal to or smaller than the amount of the LDPE. It is thus made possible to most effectively orient the metal pigment and to express the highest degree of metallic appearance.

As the LDPE and LLDPE, these can be used those of the so-called extrusion grade. Specifically, from such a standpoint that the metal pigment can be effectively oriented in the direction of extrusion, it is desired to use those that have melt flow rate (MFR) at 190° C. of not larger than 1.0 g/10 min. and, specifically, in a range of 0.3 to 1.0 g/10 min. That is, if there are used those having large MFR, then the metal pigment tends to be less oriented due to the flow during the melt extrusion.

The decorative resin composition obtained by dispersing the metal pigment in the blend is used for forming the metallic layer of the directly blow-formed bottle. Here, the metallic layer is not, usually, provided at a position where it comes into contact with the content; i.e., on the inside of the metallic layer, another layer is present neighboring thereto.

In the present invention, however, the metallic layer is formed at the above-mentioned position. It is, therefore, desired that the blend of the LDPE and LLDPE has a melt viscosity close to that of a resin that forms the layer that neighbors the metallic layer on the inner side thereof. Concretely speaking, it is more desired that when the shear viscosities (Pa·s) of the resin that is forming a layer neighboring the metallic layer on the inner side thereof are denoted by $V_6$ and $V_{30}$, the shear viscosities (Pa·s) being the values at shear rate 6 s$^{-1}$ and 30 s$^{-1}$ measured at a temperature of 210° C., then the blend used for forming the metallic layer satisfies the following viscosity condition formulas (1) and (2):

$$\eta_6 \geq V_6 - 2000 \qquad (1)$$

$$\eta_{30} \geq V_{30} - 2000 \qquad (2)$$

wherein $\eta_6$ and $\eta_{30}$ are, respectively, shear viscosities (Pa·s) at the shear rate 6 s$^{-1}$ and 30 s$^{-1}$ measured at the temperature of 210° C.

It is, further, most desired that the above blend satisfies the following viscosity condition formula (3):

$$\eta_{10} \geq V_{10} - 2000 \qquad (3)$$

wherein $V_{10}$ is a shear viscosity (Pa·s) at a shear rate 10 s$^{-1}$ of the resin neighboring the metallic layer on the inner side thereof, and $\eta_{10}$ is a shear viscosity (Pa·s) at a shear rate 10 s$^{-1}$ of the polyethylene used for forming the metallic layer.

Upon preparing the blend of the LDPE and LLDPE so as to satisfy the above viscosity conditions, it is allowed to effectively prevent the deformation of the metal pigment during the extrusion forming.

The viscosity conditions required for the blend will be described later.

In the invention, the decorative resin composition obtained by dispersing the metal pigment in the base resin (LDPE and LLDPE) may be mixed with any other components so far as they do not impair the orientation of the metal pigment. For instance, the decorative resin composition is often mixed with a dispersing agent that works to homogeneously disperse the metal pigment as described above.

<Multilayered Directly Blow-Formed Bottle>

The above-mentioned decorative resin composition of the present invention is used for producing a multilayered directly blow-formed bottle based on the extrusion forming. Namely, the bottle is produced by forming a preform (parison) of the shape of a pipe having a predetermined multilayered structure based on the extrusion forming, pinching off an end of the preform on one side thereof, and, in this state, blowing a fluid such as the air into the preform to shape it into a bottle. In the bottle, the decorative resin composition of the invention is used for forming the metallic layer at a position where it can be seen from the exterior. During the extrusion forming, the metal pigment is oriented in the direction of extrusion, and excellent metallic appearance is expressed.

Figure 1B:
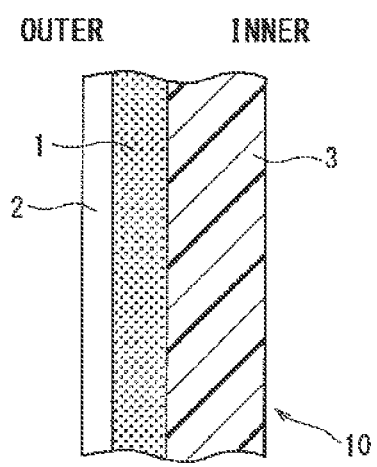
Figure 1C:
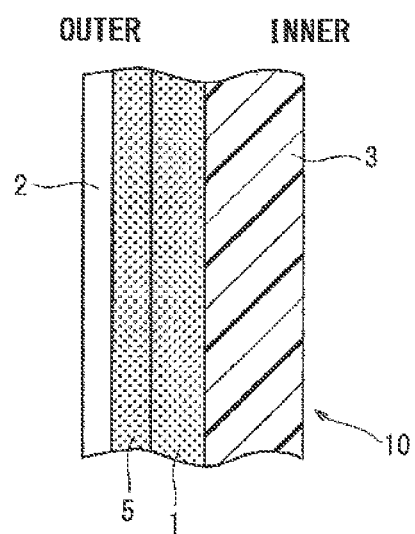

Referring, for example, to FIGS. 1A, 1B and 1C that illustrate layer structures of the above multilayered directly blow-formed bottles, the metallic layer designated at 1 is formed of the decorative resin composition of the invention in the bottle (generally designated at 10).

That is, in an embodiment of FIG. 1A, the metallic layer 1 in which a metal pigment is dispersed is formed on the outer surface, and an inner layer 3 is formed on the lower side thereof neighboring thereto and being positioned on the inner surface side to come in contact with a content.

In an embodiment of FIG. 1B, a transparent resin layer 2 is formed on the outer surface, and the metallic layer 1 is formed on the lower side of the transparent resin layer 2. In this embodiment, too, the inner layer 3 is formed neighboring thereto being positioned on the inner surface side to come in contact with the content. The metallic layer 1 may be formed at a position where it can be seen from the outer surface side. Therefore, the transparent resin layer 2 may be decorated by being mixed with a pigment different from the pigment added to the metallic layer 1 so far as the metallic layer 1 can be seen.

Further, so far as the metallic layer 1 can be seen, it is allowable as shown in FIG. 1C to provide a decorative resin layer 5 formed by mixing a transparent resin with a pigment between the transparent resin layer 2 forming the outer surface and the metallic layer 1. The pigment added to the decorative resin layer 5, too, is different from the pigment added to the metallic layer 1, and may be a metal pigment (e.g., pearl pigment or the like) having an average thickness of, for example, in excess of 1 μm. In any layer structure, the metallic layer 1 is formed neighboring the inner layer 3 that is positioned on the inner surface side to come in contact with the content.

In any embodiment as described above, decorative effect is obtained by the metallic layer 1.

Metallic Layer 1;

As described above, the metallic layer 1 is a layer formed by using the decorative resin composition of the present invention mentioned above, and in which a metal pigment is oriented along the direction in which a preform for forming the bottle 10 is extruded (in the direction of height of the bottle 10) to thereby impart a favorable metallic appearance.

The metallic layer 1 in the body portion has a thickness that may vary depending on the size of the bottle, but should have a suitable degree of thickness and, preferably, a thickness of, for example, not less than 10 μm. Namely, if the metallic layer 1 is too thin, the base resin tends to flow irregularly at the time of extrusion forming. As a result, the metal pigment is not oriented to a sufficient degree and the metallic appearance may deteriorate.

Transparent Resin Layer 2;

In the present invention, when the metallic layer 1 is formed on the lower side of the transparent resin layer 2 which forms the outer surface as shown in FIG. 1(b) FIG. 1B, the transparent resin can be any one of a variety of kinds of thermoplastic resins that are used for directly blow-forming the bottles under the condition that the thermoplastic resin has a transparency that does not hinder the metallic appearance exhibited by the metallic layer 1 which is the lower layer.

As the thermoplastic resin, though not specifically limited, there can be generally and favorably used an olefin type resin or a polyester resin of a grade for use in the extrusion forming.

As the olefin type resin, there can be exemplified polyethylenes such as low-density polyethylene (LDPE), medium-density polyethylene (MDPE), high-density polyethylene (HDPE), linear low-density polyethylene (LLDPE), linear very-low-density polyethylene (LVLDPE), as well as polypropylene, ethylene-propylene copolymer, polybutene-1, ethylene-butene-1 copolymer, propylene-butane-1 copolymer, ethylene-propylene-butane-1 copolymer, ethylene-vinyl acetate copolymer and ionically crosslinked olefin copolymer (ionomer). Further, an amorphous or low-crystalline copolymer of a non-cyclic olefin and a cyclic olefin (COC), too, can be used as a transparent resin for forming the transparent resin layer 2.

As the polyester resin, there can be exemplified polyethylene terephthalate (PET), polybutylene terephthalate (PBT), polyethylene naphthalate (PEN) and amorphous polyester resin having small amount of copolyester units introduced in the ethylene terephthalate unit.

As the copolymerizable component for forming the above copolyester, there can be exemplified dicarboxylic acid components such as isophthalic acid, p-β-oxyethoxybenzoic acid, naphthalene-2,6-dicarboxylic acid, diphenoxyethane-4,4'-dicarboxylic acid, 5-sodiumsulfoisophthalic acid, adipic acid, sebacic acid, and alkyl ester derivatives of these dicarboxylic acids; and glycol components such as propylene glycol, 1,4-butanediol, neopentyl glycol, 1,6-hexylene glycol, cyclohexanedimethanol, ethylene oxide adduct of bisphenol A, diethylene glycol and triethylene glycol.

In the present invention, it is particularly desired to use the olefin type resin and the amorphous polyester resin from the standpoint of scratch resistance, flexibility and luster.

The thickness of the transparent resin layer 2 in the body portion can be set to lie in a suitable range depending on the size and flexibility required for the directly blow-formed bottle 10 as well as easiness to squeeze the bottle. Usually, however, the thickness is set to lie from about 10 to about 200 m.

Further, when the metallic layer 1 is formed on the lower side of the transparent resin layer 2 that forms the outer surface as shown in FIG. 1(b) FIG. 1B, an adhesive resin layer can be suitably interposed between them if adhesiveness is poor between the transparent resin layer 2 and the metallic layer 1 (e.g., if the transparent resin layer 2 is formed of the polyester resin).

The adhesive resin layer can be formed by using an adhesive resin that has been known per se., such as ethylene-α-olefin copolymer resin, acid-modified resin thereof, copolymerized resin of an olefin and an acid, and glycidyl group-containing resin. To further improve the adhesiveness, a known tackifier may be added to these resins.

As the copolymer resin, there can be used those produced by any copolymerizing method such as random, block or graft copolymerization. As the acid-modified resin, for example, there can be used a resin graft-modified with an unsaturated carboxylic acid such as acrylic acid, methacrylic acid, maleic acid, fumaric acid, itaconic acid or crotonic acid, or with an anhydride thereof. These resins can be used in a single kind, as a blend of two or more kinds or as a blend with other resins. As the tackifier, there can be exemplified rosin type resin, terpene type resin and petroleum resin. These resins can be used in a single kind or as a mixture of two or more kinds.

Further, the adhesive resin layer may be added with a known additive. As the additive, there can be used, for example, thermoplastic elastomer, other thermoplastic resins, rubber resin, inorganic filler, pigment, plasticizer, antioxidant, antistatic agent, light stabilizer and antiblocking agent. A particularly preferred resin is a polyolefin resin (specifically, polyethylene type resin) to which a tackifier is added. Further, as the thermoplastic elastomer, there is preferably used a styrene type elastomer to reduce ruggedness in the interface of the layers.

It is, further, allowable to mix the adhesive resin layer with a metal pigment described in the paragraph of the metallic layer in order to further improve the metallic appearance.

The thickness of the adhesive resin layer may be such that a suitable degree of adhesive force is obtained, and is, usually, about 10 to about 200 μm.

Inner Layer 3;

In the layer structures of FIGS. 1(a) and 1(b), the inner layer that faces the inner surface is formed by using a widely known thermoplastic resin that is used for forming the directly blow-formed bottles of this kind, such as the above-mentioned olefin type resin or the polyester resin. Specifically, the inner layer that faces the inner surface is desirably formed by using a high-density polyethylene (HDPE) having a density of not less than 0.930 g/cm$^3$. The inner layer formed by using the HDPE has a thickness which is, usually, about 50 to about 200 μm.

Further, the inner layer can be formed in a multilayered structure comprising a plurality of resin layers. For example, scraps such as burrs generated in forming the bottles 10 may be mixed with a virgin resin, and an intermediate layer may be formed as a layer of the regrind resin provided the layer of the regrind resin is not facing the interior of the bottle 10.

Moreover, a gas-barrier resin layer can be provided as an intermediate layer that is not facing the interior.

As the gas-barrier resin for forming the gas-barrier resin layer, there can be representatively used a resin having an oxygen permeation under 37° C.-0% RH of not more than 5.5×10$^{-12}$ cc·cm/cm$^2$ sec·cmHg, such as ethylene-vinyl alcohol copolymer or polyamide and, specifically, ethylene-vinyl alcohol copolymer.

As the ethylene-vinyl alcohol copolymer (saponified product of ethylene-vinyl acetate copolymer), concretely speaking, there can be preferably used a saponified product of a copolymer obtained by saponifying an ethylene-vinyl acetate copolymer having an ethylene content of 20 to 60 mol % and, specifically, 25 to 50 mol % such that the degree of saponification is not less than 96% and, specifically, not less than 99 mol %. The ethylene-vinyl alcohol copolymer (hereinafter often called EVOH) should have a molecular weight large enough for forming a film and, usually, has an intrinsic viscosity which is not less than 0.01 dl/g and, specifically, not less than 0.05 gl/g as measured in a mixed solvent of phenol and water at a weight ratio of 85/15 at 30° C.

In the above gas-barrier resin layer, the oxygen-barrier resin may be blended with any other thermoplastic resin so far as its excellent oxygen barrier property is not impaired.

The intermediate layer that is not facing the interior may, further, include an oxygen-absorbing resin layer that is known per se. The oxygen-absorbing resin layer works to reinforce the oxygen barrier property and, as described in JP-A-2002-240813 and others, is a layer that contains an oxidizable polymer and a transition metal type catalyst. Being assisted by the action of the transition metal type catalyst, the oxidizable polymer is oxidized with oxygen, i.e., absorbs oxygen and hence shuts off the permeation of oxygen. The oxidizable polymer and the transition metal type catalyst have been closely described in the above JP-A-2002-240813 and others, and, therefore, are not described here in detail. Representative examples of the oxidizable polymer include olefin type resins having tertiary carbon atoms (e.g., polypropylene, polybutene-1, and copolymers thereof), thermoplastic polyester and aliphatic polyamide; xylylene group-containing polyamide resins; and ethylenically unsaturated group-containing polymers (e.g., polymers derived from polyenes such as butadiene and the like). Further, representative examples of the transition metal type catalyst include inorganic salts, organic acid salts and complex salts of transition metals such as iron, cobalt and nickel.

The gas-barrier resin layer or the oxygen-absorbing resin layer used as the intermediate layer should have a thickness large enough to exhibit oxygen-barrier property required depending on the size of the bottle 10 and the kind of the content. Further, both the gas-barrier resin layer and the oxygen-absorbing resin layer may be provided to form the intermediate layer.

With the inner layer 3 being formed in a multilayered structure as described above, if the adhesiveness is poor between the neighboring layers or if the adhesiveness is poor between the inner layer 3 and the metallic layer 1, then the above-mentioned adhesive resin layer may be interposed between them.

In the invention, the total thickness of the inner layer 3 may be set depending on the structure of the layers, kind of the resin used and the size (capacity) of the bottle 10 so as to exhibit properties required for the bottle 10.

Decorative Resin Layer 5;

In the invention as shown in FIG. 1C, a decorative resin layer 5 is suitably formed between the transparent resin layer 2 forming the outer surface and the metallic layer 1. Here, the transparent resin forming the decorative resin layer 5 is mixed with a pigment. As the transparent base resin, there can be exemplified various resins exemplified above for the metallic layer 1 and the transparent resin layer 2, or adhesive resins exemplified for the adhesive resin layer.

Further, the pigment added for decoration may be a pigment different from the metal pigment added to the metallic layer 1 so far as it does not impair the legibility of the metallic layer 1. For instance, in addition to using a variety of kinds of inorganic or organic pigments, there can be used a pigment having an average thickness of more than 1 μm or a pearl-like pigment obtained by coating the natural mica with a titanium oxide or an iron oxide among those exemplified as metal pigments for use in the metallic layer 1.

In the multilayered directly blow-formed bottle 10 of the present invention having the above layer structure, the layers constituting the bottle may be each mixed with a lubricant, various modifiers and ultraviolet ray absorber so far as they do not impair the metallic appearance.

<Production of the Multilayered Directly Blow-Formed Bottle 10>

To produce the above multilayered directly blow-formed bottle 10, a pipe-like multilayered preform (parison) is formed by the co-extrusion method by using extruders of a number corresponding to the number of the layers. The preform is then pinched off at its one end, and a blowing fluid such as the compressed air is blown therein so as to be imparted with the shape of a bottle.

Here, the above-mentioned metal pigment has been dispersed in the metallic layer 1. At the time of extrusion forming, therefore, the extruder extrudes a resin composition obtained by mixing the metal pigment in the base resin that forms the metallic layer 1. In the present invention, it is desired that the metal pigment and the base resin are mixed together in a state where the base resin has been plasticized. Concretely speaking, the base resin is thrown into a kneading unit of the extruder, and the metal pigment (concretely, the above-mentioned dispersant in which the metal pigment has been dispersed) is thrown therein in a state where the base resin has been melted so as to be kneaded together therewith. In this state, the resin composition is extruded from the extruder to thereby form the metallic layer 1 in the multilayered preform.

Employment of the above means works to effectively relax the shearing force applied to the metal pigment by the screw of the extruder. Therefore, the metal pigment is effectively prevented from being damaged or deformed during the extrusion forming and in this state, the metal pigment is oriented in the direction of extrusion. The thus oriented state is maintained unchanged even after the blowing of the fluid, and a favorable metallic appearance is exhibited maintaining stability.

For example, if the metal pigment is thrown in a stage before the base resin is plasticized, an increased shearing force is applied to the metal pigment due to the screw of the extruder. As a result, the metal pigment tends to be damaged or deformed causing the metallic appearance to be varied.

Figure 2:
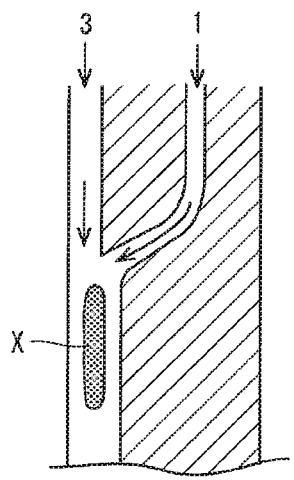
FIG. 2 is a view illustrating the flow of a resin for forming a metallic layer and a resin for forming a layer (inner layer) that neighbors the metallic layer.

The above extrusion forming is executed by attaching a die for multilayer formation to an end of the extruder, and melt-extruding the resins (or the resin compositions) corresponding to the layers into a cylindrical shape in an annular space in the die. Referring, for example, to FIG. 2, the metallic layer 1 is provided neighboring the inner layer 3. In this case, the resin flow of the inner layer 3 is extruded maintaining a straight cylindrical shape while from an annular space neighboring the multilayer die, a resin flow of the metallic layer 1 neighboring the inner layer 3 (resin flow of the decorative resin composition of the invention) is extruded with its diameter being contracted inward and merges the resin flow of the inner layer 3. The resin flows after having merged together are extruded down maintaining a straight cylindrical shape of a layer structure of the resin flow of the inner layer 3 and the resin flow of the metallic layer 1. In FIG. 2, X represents a region where the resin flow of the inner layer 3 and the resin flow of the metallic layer 1 merge together. In the merging region X, the molten resin acquires the greatest flow speed. Therefore, the resin flow of the metallic layer 1 receives the greatest shearing force in the merging region X.

The resin positioned on the outer surface of the metallic layer 1 has not been shown in FIG. 2. The resin, however, is so extruded that the diameter thereof is contracted from the outer surface side and merges the above merged resin flow in a portion after the merged resin flow has become a stable flow.

In executing the extrusion forming as described above, the resin of the layer positioned on the outer surface side of the metallic layer 1 merges at a moment when the resin flow of the decorative resin composition for forming the metallic layer 1 has become stable, and does not almost affect the resin flow of the decorative resin composition. On the other hand, the resin flow of the inner layer 3 neighboring the inner side of the metallic layer 1 merges the resin flow of the metallic layer 1 (resin flow of the decorative resin composition) in the merging region X. Therefore, if the shear viscosity of the resin flow of the decorative resin composition (i.e., shear viscosity of the blend) is very smaller than the shear viscosity of the resin flow of the inner layer 3, the interface becomes irregular between the resin flow of the inner layer 3 and the resin flow of the metallic layer 1 in the merging region X whereby the thickness of the metallic layer 1 becomes irregular causing the development of shark skin. More than that, the metal pigment contained in the resin flow (decorative resin composition) is deformed and the metallic appearance is deteriorated. This is because the metal pigment has a very small thickness and is subject to be deformed by the shearing force caused by a difference in the viscosity.

In the present invention, on the other hand, as described earlier, a blend of the LDPE and the LLDPE used for forming the decorative resin composition is so prepared as to satisfy the shear viscosity conditions specified by the following formulas (1) and (2), $$\eta_6 \geq V_6 - 2000 \tag{1}$$

$$\eta_{30} \geq V_{30} - 2000 \tag{2}$$

wherein $V_6$ and $V_{30}$ are, respectively, shear viscosities (Pa·s) of the resin that forms a layer neighboring the metallic layer 1 on the inner side thereof at the shear rate 6 s$^{-1}$ and 30 s$^{-1}$ measured a temperature of 210° C., and $\eta_6$ and $\eta_{30}$ are, respectively, shear viscosities (Pa·s) of the blend at the shear rate of 6 s$^{-1}$ and 30 s$^{-1}$ measured at a temperature of 210° C.

It is, therefore, made possible to suppress inconvenience caused by a difference in the viscosity with the viscosity of the inner layer neighboring the metallic layer 1.

In the embodiment of FIG. 2, the layer neighboring the metallic layer 1 on the inner side thereof is the inner layer 3 (e.g., layer formed of a polyethylene such as HDPE) that is facing the interior of the bottle. Here, when the inner layer 3 itself has a multilayer structure, the layer neighboring the metallic layer 1 can be a regrind resin layer, a gas-barrier layer, an oxygen-absorbing layer or an adhesive layer depending upon the structure of the layers. In this case, the blend used for forming the metallic layer 1 is so prepared as to satisfy the conditions of the above formulas (1) and (2) for the resins that are forming the resin layers.

That is, when the inner layer is formed by using the polyethylene, the melt-extrusion temperature is roughly about 150 to about 230° C., i.e., a temperature near 210° C. Further, the shear rate in the die head (specifically, the shear rate in the merging region X) is in a range of about 6 s$^{-1}$ to about 30 s$^{-1}$. It will, therefore, be understood that the viscosity conditions are such that, in the die head of the extruder and, specifically, in the merging region X, the viscosity of the resin neighboring the metallic layer on the inner side thereof is not excessively greater than the viscosity of the polyethylene used for forming the metallic layer.

By forming the metallic layer 1 using the blend that satisfies the conditions of the above formulas (1) and (2), it is made possible to effectively relax the stress caused by the resin flow of the metallic layer 1 in the merging region X and, as a result, to effectively prevent the metallic pigment from deforming, to express more excellent metallic appearance being assisted by the orientation of the metallic pigment and, besides, to more effectively suppress irregularity in the thickness of the metallic layer 1 and the development of shark skin.

Figure 3:
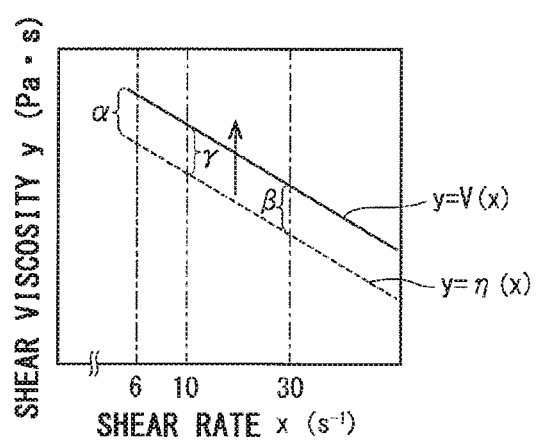
FIG. 3 is a diagram illustrating preferred viscosity conditions satisfied by a blend of an LDPE and an LLDPE used for forming the metallic layer.

FIG. 3 shows a shear viscosity curve y=V(x) of the resin used for forming the inner layer 3. In the curve, the vertical axis y represents the shear viscosity (Pa·s) and the horizontal axis x represents the shear rate (s$^{-1}$). From the shear viscosity curve, when the metallic layer 1 is to be provided neighboring the inner layer 3, a curve y=η(x) in FIG. 3 represents the lower limit values of the shear viscosity that should be satisfied by the blend that is used for forming the metallic layer.

The viscosity condition formulas (1) and (2) are so set that the shear viscosities at the shear rate 6 s$^{-1}$ and 30 s$^{-1}$ lie within predetermined ranges. In FIG. 3, a is a value (2000 Pa·s) that corresponds to (V$_6$−η$_6$) in the formula (1) and β is a value (2000 Pa·s) that corresponds to (V$_{30}$−η$_{30}$) in the formula (2).

In the invention, it is desired that the blend used for forming the metallic layer 1 satisfies the following viscosity condition formula (3), $$\eta_{10} \geq V_{10} - 2000 \quad (3)$$

wherein V$_{10}$ is a shear viscosity (Pa·s) at a shear rate 10 s$^{-1}$ of the resin neighboring the metallic layer 1 on the inner side thereof, and η$_{10}$ is a shear viscosity (Pa·s) at a shear rate 10 s$^{-1}$ of the blend used for forming the metallic layer 1.

Namely, in FIG. 3, the shear viscosity curve is represented by a nearly straight line. Depending on the blend that is used, however, the curve may become upwardly convex or downwardly convex in the region of the shear rate 6 s$^{-1}$ to 30 s$^{-1}$. Therefore, despite the shear viscosity at the shear rate 6 s$^{-1}$ and the shear viscosity at the shear rate 30 s$^{-1}$ are satisfying the conditions of the formulas (1) and (2), it could happen that the shear rate of the blend becomes very smaller than the shear rate of the resin of the layer neighboring on the inner side in a region midway between the shear rate 6 s$^{-1}$ and the shear rate 30 s$^{-1}$. Here, however, if the blend for forming the metallic layer 1 is so prepared that the shear viscosity of the blend becomes close to the shear viscosity of the resin of the layer neighboring thereto even when the shear rate is 10 s$^{-1}$ as represented by the above viscosity condition formula (3), then the shear viscosity of the blend can be brought close to the shear viscosity of the resin of the layer neighboring thereto over the whole region of shear rate of 6 s$^{-1}$ to 30 s$^{-1}$ (corresponds to the shear rate of the resin in the die head). That is, the shear viscosity of the blend for forming the metallic layer 1 becomes close to the shear viscosity of the resin of the layer neighboring the metallic layer 1 on the inner side thereof in the merging region X where the shear rate is not uniform. It is thus made it possible to more reliably suppress the metallic pigment from being deformed due to the difference in the shear viscosity in the merging region X.

In FIG. 3, γ is a value (2000 Pa·s) that corresponds to (V$_{10}$−η$_0$) in the formula (3).

To satisfy the viscosity condition formulas (1) and (2), or to, further, satisfy the viscosity condition formula (3) as described above, the blend of the LDPE and the LLDPE prepared in advance is measured for its shear viscosity by a method described in Examples appearing later. If the above condition formulas (1) to (3) have not been satisfied, the blend of the LDPE and the LLDPE should be changed within the above-mentioned range, or the kind of the LDPE or the LLDPE used for the blend should be suitably changed.

In the thus obtained multilayered directly blow-formed bottle 10, the metallic layer 1 for metallic decoration is formed simultaneously with the formation of the bottle without requiring the coating or any treatment with a decorative shrink film after the metallic layer 1 has been formed. Besides, the metallic layer 1 can be formed by using an existing extrusion-forming machine effectively alleviating an increase in the cost for imparting metallic decoration and, besides, without receiving limitation on the shape of the bottle (specifically, on the shape of the body portion) that is caused when the shrink film for metallic decoration is used. Besides, despite the metallic layer 1 containing the metal pigment dispersed therein is formed by the extrusion forming, the metal pigment is effectively prevented from being damaged or deformed, and favorable metallic appearance can be imparted maintaining stability.

In the multilayered directly blow-formed bottle 10, for example, the metal pigment in the metallic layer 1 has been effectively oriented in the direction of extrusion. Therefore, when the light is caused to be incident on the outer surface of the bottle wall at an angle of 45 degrees by using a multi-angle colorimeter, a lightness L*$_{15}$ due to the light reflected in a direction of 15 degrees relative to the regularly reflected light is not less than 150 and is not less than 160 at the highest.

Further, accompanying such a high lightness L*$_{15}$, a flip-flop (FF) value represented by the following formula, too, becomes as high as 15 or more.

$$FF=(L^*_{15}-L^*_{110})/L^*_{45}$$

wherein,

L*$_{15}$ is a lightness due to the light reflected in a direction of 15 degrees relative to the regularly reflected light of when the light is caused to be incident on the outer surface of the bottle wall at an angle of 45 degrees, L*$_{110}$ is a lightness due to the light reflected in a direction of 110 degrees relative to the regularly reflected light, and L*$_{45}$ is a lightness due to the light reflected in a direction of 45 degrees relative to the regularly reflected light (90 degrees relative to the reflection surface).

That is, the lightness L*$_{15}$ and the FF value that are high stand for that a very excellent metallic appearance is being expressed.

The L* values representing the lightness of the reflected light are all the L* values in the L*a*b* color systems (CIE 1976 Color Space).

In the present invention, the above-mentioned multilayered directly blow-formed bottle 10 may have various layer constitutions as shown in FIGS. 1A, 1B and 1C. Most generally, however, the following layer constitution is employed.

Outermost Layer (Transparent Layer):
  Amorphous polyester resin layer
  Thickness: 10 to 200 µm, specifically, 25 to 100 µm
Adhesive Layer:
  Adhesive resin
  Thickness: 20 to 200 µm
Metallic Layer:
  Metal pigment (specifically, flaky aluminum pigment)
  LDPE: LLDPE=15: 85 to 85: 15 (mass ratio)
  Thickness: 10 to 200 µm, specifically, 30 to 100 µm
Regrind Resin Layer:
  Burrs generated when the bottle is being formed and HDPE
  Thickness: 500 to 1000 µm
Innermost Layer:
  HDPE
  Thickness: 50 to 200 µm The multilayered directly blow-formed bottle having a metallic layer formed by using the decorative resin composition of the invention effectively alleviates an increase in the cost of metallic decoration. Therefore, the bottle can be used for containing expensive products such as cosmetics, as a matter of course, as well as for containing inexpensive products such as shampoo, rinse, liquid detergent, softening agent, and can contribute to enhancing commercial appeal based on metallic decorative appearance.

Examples

Excellent effects of the multilayered directly blow-formed bottle of the invention will now be described by the following Experimental Examples to which only, however, the invention is in no way limited.

In the following Experimental Examples, the resins that were used were measured for their shear viscosities as described below.

<Measuring the Shear Viscosity>

The shear viscosity was measured by using the CAPILO-GRAPH manufactured by Toyo Seiki Seisaku-sho, Ltd. and in compliance with the JIS K7199, 1999. Measuring conditions consisted of using a capillary die having a capillary length of 10 mm and a capillary diameter of 1.0 mm. Measurement was taken at a temperature of 210° C., pre-heating time of 5 minutes, residence time of 15 minutes and gradually decreasing the shear rate.

Examples 1 to 10 and Comparative Examples 1 to 4

A 500-ml multilayered bottle (50 g) was formed by using a directly blow-forming machine and an extruder described below.

Forming machine: Shuttle type forming machine manufactured by Tahara Co.
Extruder: first layer, φ30-FF L/D=22
  second layer, φ30-FF L/D=22
  third layer, φ30-FF L/D=22
  fourth layer, φ55-FF L/D=28
  fifth layer, φ40-FF L/D=28
Layer Constitution of the Bottle and Materials.
Layer constitution: five-kind-five-layer
  (Outer side) PET/AD/metallic layer (base resin+aluminum pigment)/HDPE/HDPE (inner side)
  (Outer side) 5/7/10/68/10 (unit: wt %) (inner side)

Materials:
Polyethylene Terephthalate Resin (PET):
  EASTAR GN001 produced by Eastman Chemical Company
Adhesive Resin (AD):
  MODIC F573 produced by Mitsubishi Chemical Corporation
Base Resin for the Metallic Layer:
Low-density polyethylene (LDPE)
  LDPE-A: SUMIKATHENE F108-2 produced by Sumitomo Chemical Co., Ltd.
    Density: 0.921 g/cm$^3$
    MFR (190° C.): 0.4 g/10 min.
  LDPE-B: NOVATEC LB420M produced by Japan Polyethylene Corporation
    Density: 0.922 g/cm$^3$
    MFR (190° C.): 0.7 g/10 min.
Linear low-density polyethylene (LLDPE):
  NOVATEC UF230 produced by Japan Polyethylene Corporation
    Density: 0.921 g/cm$^3$
    MFR (190° C.): 1.0 g/10 min.
Aluminum Pigment in the Metallic Layer
Aluminum Pigment A:
  average thickness 300 nm, average particle size 11 µm, aspect ratio 37
Aluminum Pigment B:
  average thickness 200 nm, average particle size 7 µm, aspect ratio 35
Aluminum Pigment C:
  average thickness 400 nm, average particle size 15 µm, aspect ratio 38
Aluminum Pigment D:
  average thickness 700 nm, average particle size 50 µm, aspect ratio 71
Aluminum Pigment E:
  average thickness 30 nm, average particle size 8 µm, aspect ratio 270
  (The aluminum pigments were used in the form of pellets that contain polyethylene wax as a dispersant)
High-Density Polyethylene (HDPE):
  HI-ZEX 6700B produced by Prime Polymer Co., Ltd.
    Shear viscosity: 6196 Pa·s (6 s$^{-1}$)
      2593 Pa·s (30 s$^{-1}$)
      4555 Pa·s (10 s$^{-1}$)

Table 1 shows the kinds of the base resins in the metallic layers, blending ratios, and kinds and contents of the aluminum pigments used in Examples and Comparative Examples.

The prepared multilayered bottles were evaluated for their lightness $L^*_{15}$, flip-flop (FF) values and metallic appearance. The results were as shown in Table 1.

Described below are the methods of evaluation.
(Average Thickness and Average Particle Size of the Aluminum Pigment)

An average thickness of the aluminum pigment is found by selecting 50 aluminum pigment particles in a random fashion, measuring their thicknesses by using a scanning electron microscope and calculating an average value therefrom. An average particle size is represented by $D_{50}$ which is a particle size at a cumulative degree 50% on a volume cumulative particle size distribution curve as found by using a laser diffraction particle size distribution measuring apparatus.

($L^*_{15}$, FF Value)

The central portion of the body of the prepared multilayered bottle was cut open at four places maintaining a gap of 90° to obtain test pieces. By using a multi-angle Spectrophotometer MA94JP manufactured by X-Rite Inc., the light over a wavelength range of 400 to 700 nm is caused to fall on a flat test surface of the test piece at an angle of incidence of 45° with respect to the direction perpendicular to the test surface that is regarded to be a 0° reference. Lightness (L* values in the L*a*b* color system) of the light reflected in the directions of 15°, 45° and 110° which are the offset angles of the incident light from the direction of regular reflection are, respectively, measured as $L^*_{15}$, $L^*_{45}$ and $L^*_{110}$.

By using the thus measured L* values ($L^*_{15}$, $L^*_{45}$, $L^*_{110}$), a degree of change in the L* value between the offset angles 15° and 110° is calculated as an FF value as follows:

$$\text{FF value} = 2.69 * (L^*_{15} - L^*_{110})^{1.11} / L^{*0.86}_{45}$$

(Overall Evaluation)

Table 1 below shows the results of overall evaluation inclusive of metallic appearance and defective appearance (die line, unmelted resin) with the eye. The evaluation is based on Comparative Example 1 which is regarded to be a reference, and +++ represents very excellent, ++ represents excellent, and + represents good. A symbol± means the result is equivalent to the reference.

TABLE 1

| | Metallic layer | | | | |
| --- | --- | --- | --- | --- | --- |
| | | Aluminum pigment | | Evaluation | |
| | Base resin blending ratio (mass %) | (mass parts per 100 mass parts of the base resin) | $L^*_{15}$ | FF value | Overall evaluation |
| Example 1 | LDPE-A:LLDPE = 15:85 | aluminum pigment A (5) | 160 | 19 | ++ |
| Example 2 | LDPE-A:LLDPE = 25:75 | aluminum pigment A (5) | 161 | 22 | +++ |
| Example 3 | LDPE-A:LLDPE = 50:50 | aluminum pigment A (5) | 171 | 21 | +++ |
| Example 4 | LDPE-A:LLDPE = 75:25 | aluminum pigment A (5) | 173 | 19 | ++ |
| Example 5 | LDPE-A:LLDPE = 85:15 | aluminum pigment A (5) | 160 | 17 | + |
| Example 6 | LDPE-B:LLDPE = 50:50 | aluminum pigment A (5) | 164 | 24 | +++ |
| Example 7 | LDPE-A:LLDPE = 50:50 | aluminum pigment A (10) | 160 | 15 | +++ |
| Example 8 | LDPE-A:LLDPE = 50:50 | aluminum pigment A (30) | 155 | 15 | + |
| Example 9 | LDPE-A:LLDPE = 50:50 | aluminum pigment B (5) | 162 | 17 | +++ |
| Example 10 | LDPE-A:LLDPE = 50:50 | aluminum pigment C (5) | 187 | 24 | +++ |
| Comp. Ex. 1 | LDPE-A:LLDPE = 100:0 | aluminum pigment A (5) | 145 | 18 | ± |
| Comp. Ex. 2 | LDPE-A:LLDPE = 0:100 | aluminum pigment A (5) | 150 | 15 | ± |
| Comp. Ex. 3 | LDPE-A:LLDPE = 50:50 | aluminum pigment D (5) | 150 | 15 | ± |
| Comp. Ex. 4 | LDPE-A:LLDPE = 50:50 | aluminum pigment E (5) | 141 | 13 | ± |

Described below are the shear viscosities η (Pa·s) at shear rate 6 s$^{-1}$, 30 s$^{-1}$ and 10 s$^{-1}$ as measured at a temperature of 210° C. of the blends used for forming the metallic layers in Examples 2 and 3.

Example 2

6804 Pa·s (6 s$^{-1}$)

4053 Pa·s (30 s$^{-1}$)

5400 Pa·s (10 s$^{-1}$)

Example 3

7451 Pa·s (6 s$^{-1}$)

3943 Pa·s (30 s$^{-1}$)

5456 Pa·s (10 s$^{-1}$)

The relationships of the shear viscosities of the blends used for forming the metallic layers and the shear viscosities of the HDPE used for forming the neighboring inner layer are satisfying the viscosity condition formulas (1), (2) and (3).

DESCRIPTION OF REFERENCE NUMERALS

1: metallic layer
2: transparent resin layer
3: inner layer
5: decorative resin layer
10: multilayered directly blow-formed bottle

The invention claimed is:

1. A decorative resin composition containing a metal pigment having an average thickness of not more than 600 nm dispersed in a blend of a low-density polyethylene (LDPE) having a density of not less than 0.910 g/cm$^3$ but less than 0.930 g/cm$^3$ and a linear low-density polyethylene (LLDPE) having a density of 0.910 to 0.925 g/cm$^3$.

2. The decorative resin composition according to claim 1, wherein said low-density polyethylene (LDPE) and said linear low-density polyethylene (LLDPE) are blended together at a mass ratio of LDPE:LLDPE=1:9 to 9:1.

3. The decorative resin composition according to claim 1, wherein both said low-density polyethylene (LDPE) and said linear low-density polyethylene (LLDPE) have melt flow rate (190° C.) of not more than 1.0 g/10 min.

4. The decorative resin composition according to claim 1, wherein said metal pigment is dispersed in an amount of 0.1 to 30.0 parts by mass per a total amount of 100 parts by mass of said low-density polyethylene (LDPE) and said linear low-density polyethylene (LLDPE).

5. The decorative resin composition according to claim 1, wherein said metal pigment is an aluminum pigment.

6. A multilayered directly blow-formed bottle in which a metallic layer formed by using the decorative resin composition of claim 1 is located at a position where it can be seen from the outer surface side.

7. The multilayered directly blow-formed bottle according to claim 6, wherein when light is incident on the outer surface of a bottle wall at an angle of 45 degrees by using a multi-angle colorimeter, a lightness $L^*_{15}$ (L*a*b* color system) due to light reflected in a direction of 15 degrees relative to regularly reflected light is not less than 150.

8. The multilayered directly blow-formed bottle according to claim 6, wherein said metallic layer is formed on a lower side of an outer surface layer or an outer surface transparent resin layer.

9. The multilayered directly blow-formed bottle according to claim 6, wherein when shear viscosities (Pa·s) of a resin that is forming a layer neighboring the metallic layer on an inner side thereof are denoted by $V_6$ and $V_{30}$, shear viscosities (Pa·s) being values at shear rate 6 s$^{-1}$ and 30 s$^{-1}$ measured at a temperature of 210° C., then the blend used for forming the metallic layer satisfies following viscosity condition formulas (1) and (2):

$$\eta_6 \geq V_6 - 2000 \quad (1)$$

$$\eta_{30} \geq V_{30} - 2000 \quad (2)$$

wherein $\eta_6$ and $\eta_{30}$ are, respectively, shear viscosities (Pa·s) at shear rate 6 s$^{-1}$ and 30 s$^{-1}$ measured at a temperature of 210° C.

10. A method of producing the multilayered directly blow-formed bottle by preparing the decorative resin composition of claim 1 by a melt-mixing method in an extruder, co-extruding a resin composition prepared in the extruder into a preform of a shape of a pipe in which a layer of said composition is formed at a position where it can be seen from an outer surface side, and blowing a fluid into said preform that is closed at one end thereof so that said preform is shaped into a bottle.

* * * * *